US006261006B1

United States Patent
Selfridge

(10) Patent No.: US 6,261,006 B1
(45) Date of Patent: Jul. 17, 2001

(54) ENVIRONMENTAL SEALING FOR FIBER OPTIC CABLE ASSEMBLIES

(75) Inventor: Ritch Allen Selfridge, Sidney, NY (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 09/405,161

(22) Filed: Sep. 24, 1999

(51) Int. Cl.⁷ .................... G02B 6/38; G02B 6/36
(52) U.S. Cl. .................. 385/56; 385/76; 385/78; 385/94
(58) Field of Search .................. 385/55, 56, 58, 385/60, 76, 77, 78, 94, 128

(56) References Cited

U.S. PATENT DOCUMENTS

| | | | |
|---|---|---|---|
| 4,167,305 | 9/1979 | Ichiba et al. | 385/141 |
| 5,000,541 | 3/1991 | DiMarcello et al. | 385/128 |
| 5,241,611 | 8/1993 | Gould | 385/70 |
| 5,373,578 | 12/1994 | Parker et al. | 385/128 |
| 5,538,791 | 7/1996 | Shustack | 428/392 |
| 5,604,830 | 2/1997 | Kuder et al. | 385/59 |
| 5,684,910 | 11/1997 | Chapin et al. | 385/128 |
| 5,745,626 | * 4/1998 | Duck et al. | 385/96 |
| 5,980,312 | * 11/1999 | Chapman et al. | 439/540.1 |
| 6,152,609 | * 11/2000 | Dzyck et al. | 356/86 |

* cited by examiner

Primary Examiner—Georgia Epps
Assistant Examiner—David N. Spector
(74) Attorney, Agent, or Firm—Blank Rome Comisky & McCauley, LLP

(57) ABSTRACT

A fiber optic cable is terminated to a ferrule in a conventional fashion, polished and completed as would ordinarily be done, but the entire assembly or at least the termination/connector portion is coated with a conformal coating such as MIL-I-46058 XY conformal coating, also known as Parylene. The conformal coating provides an effective moisture barrier without restricting the flexibility of the cable. In addition, the conformal coating protects the polished connector/terminus interface, in case of a butt joint connection, protecting it from damage prior to installation, at which time the conformal coating on the mating face can easily be peeled off because of the polished condition of the mating face.

17 Claims, 2 Drawing Sheets

ENVIRONMENTAL SEALING FOR FIBER OPTIC CABLE ASSEMBLIES

BACKGROUND OF THE INVENTION

1. Field of the Invention

This invention relates to a method of environmentally sealing fiber optic cable assemblies, and in particular to a method of sealing fiber optic cable assemblies from moisture by coating the prepared fiber terminations with a conformal coating before assembly to a coupler, connector, or backplane. The invention also relates to fiber optic cable assemblies in which the terminations have been environmentally sealed to protect the fiber from environmental degradation, and in particular to fiber optic cable assemblies having conformally coated fiber terminations.

2. Description of Related Art

It is well known that moisture can degrade the optical performance of fiber optic cable assemblies. In order to protect the fibers in a cable from moisture absorption, acrylate such as Corning's CPC6® and polyimide coatings are applied directly to the glass fibers to create a barrier to moisture.

While acrylate or polyimide coatings protect individual fibers during shipment and before preparation for termination, in order to terminate the fibers to a connector or alignment ferrule, the coating must be removed, leaving the fibers vulnerable to degradation due to moisture and other contaminants. The problem of fiber degradation due to exposure of the bare fibers following preparation for termination is especially significant in two situations: (1) following termination to an alignment ferrule but before installation, in an assembly plant or in the field, of the alignment ferrule in a fiber optic connector or coupler, and (2) in backplane terminations and other coupler assemblies where mechanical sealing is difficult and potting undesirable.

The first situation often arises because, during assembly of a fiber optic connector or housing, the fibers are often pre-terminated to alignment ferrules in one section of an assembly plant, and not installed in a sealed connector until later. Following termination to the ferrule, the terminated fibers must be stored until needed by the worker or section of the plant that assembles the fibers to the connectors or couplers. Storing and assembling the fiber optic connectors in clean rooms would be prohibitively expensive, and so the fibers are vulnerable during the period between termination to the ferrule and assembly to the connector or coupler, even where the connector or coupler in which the terminated fiber and ferrule is to be installed is adequately sealed.

It is also common for fibers to be pre-terminated to a ferrule and carried by workers for installation in the field, prior to which the portions of the fibers that have been exposed in preparation for termination are unprotected. Fiber optic terminations often require very high tolerances, and significant damage can occur during the interval between preparation of the cable for termination and the actual termination.

The second situation arises in applications, such as those involving optical backplanes of the type disclosed in U.S. patent application Ser. No. 09/006,193, field Jan. 12, 1998, now U.S. Pat. No. 5,980,312, herein incorporated by reference, where it is impractical to use mechanical sealing arrangements. While potting would solve the problem of degradation due to moisture, potting limits the flexibility of the fiber optic cables and makes it difficult to repair and replace individual cable assemblies, which is essential in backplane installations.

In view of the above, a need exists for a environmental sealing method and arrangement which can be used to seal a fiber optic termination immediately following termination of the fiber to an alignment ferrule or connector, thereby protecting the fiber even before it is installed in a sealed connector or coupling arrangement, and avoiding the need for potting in applications where the terminations would otherwise be completely unprotected.

SUMMARY OF THE INVENTION

It is accordingly a first objective of the invention to provide a method of protecting optical fibers after preparation of the fibers for termination and/or installation in an alignment ferrule, but before termination or installation in a sealed fiber optic connector or coupling arrangement.

It is a second objective of the invention to provide a method of protecting optical fibers for use in optical backplanes and other coupling arrangements in which the fibers would otherwise be unprotected or not adequately protected, and to eliminate the need for potting of the fibers or fiber terminations in order to protect them from environmental degradation.

It is a third objective of the invention to provide a method of environmental sealing fiber optic cable assemblies that does not require modification of the cable fiber termination procedure, and that can be carried out in a simple coating step.

It is a fourth objective of the invention to provide an environmental sealing arrangement for fiber optic cable assemblies that can be used to protect the cable assemblies prior to termination, that does not require mechanical seals, that eliminates the need for potting, and that can be carried out in a single coating step.

These objectives are achieved, in accordance with the principles of a preferred embodiment of the invention by providing a method of environmentally sealing fiber optic cable assemblies, and also an environmentally sealed fiber optic cable assembly, in which the fiber optic cable is terminated to the connector in a conventional fashion, polished and completed as would ordinarily be done, but in which the entire assembly or at least the termination/connector portion is coated with a conformal coating to provide an effective moisture barrier without restricting the flexibility of the cable.

In an especially preferred embodiment of the invention, the conformal coating is a MIL-I-46058 XY conformal coating, also known as Parylene.

In one application of the principles of the preferred embodiment, the conformal coating is applied to an alignment ferrule such as a Mechanical Transfer (MT) connector or ferrule following termination of a fiber to the ferrule and polishing, the conformal coating thereby protecting the polished connector/terminus interface from damage prior to installation in an MT coupler assembly. Because the mating face of the ferrule is polished before application of the coating, it can easily be peeled off from the mating face during coupling so that the conformal coating does not interfere with mating of the respective ferrules, or with transmission of light through the ends of the fibers.

Although the example of an MT ferrule is used to illustrate the principles of the invention, those skilled in the art will appreciate that the principles of the invention will be applicable to a wide variety of different fiber optic termination arrangements, and that the invention is not to be limited to any particular type of fiber optic connector, coupler, or terminus, but rather is intended to cover any fiber optic termination arrangement in which protection of the fibers or termination is necessary or desired.

DETAILED DESCRIPTION OF THE PREFERRED EMBODIMENTS

Figure 1:
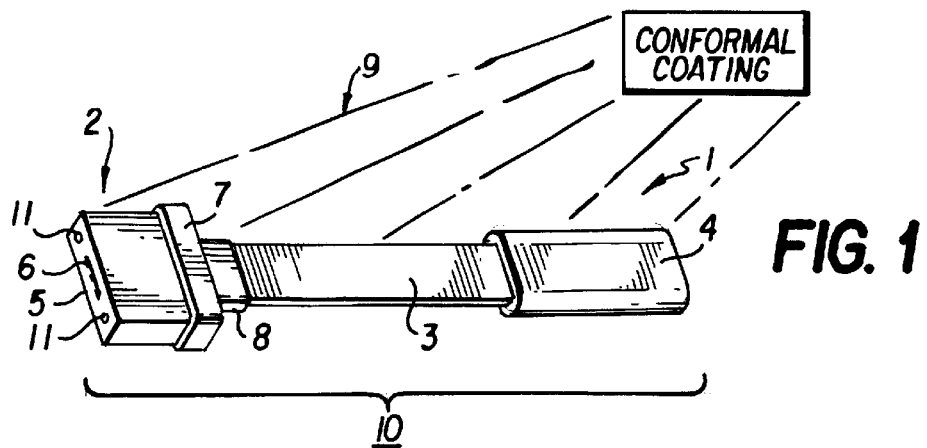
FIG. 1 is a perspective view showing a type of fiber optic termination to which a conformal coating has been applied in accordance with the principles of a preferred embodiment of the present invention.

FIG. 1 illustrates a standard Mechanical Transfer (MT) termination to which is being applied a conformal coating according to the principles of a preferred embodiment of the invention. The MT termination includes a fiber optic cable 1 and MT ferrule or connector 2, into which is inserted a portion 3 of the fiber optic cable from which outer jacket 4 has been stripped. Portion 3 of the cable is further stripped at its front end to expose individual fibers which initially extend through openings in the front surface 5 of the ferrule. The ends of the fibers are then trimmed and the front surface 5 of the ferrule polished so that the ends of the optical fibers are coplanar with the surface. Those skilled in the art will appreciate that although the ends of the fibers are indicated in FIGS. 1–5 by a line 6, a higher magnification the line 6 would be seen to be made up of individual fiber ends.

A collar 7 on the MT ferrule enables installation of the ferrule in a housing, backplane, or other coupling device or arrangement, with the stripped portion 3 extending to the rear of the ferrule to a predetermined distance depending on the requirements of the type of connector or coupling in which the MT termination is to be used. In addition, the conventional MT ferrule termination shown in FIG. 1 includes a strain relief 8 which extends from the rear of the ferrule and surrounds stripped portion 3 of the cable.

In order to protect the optical fibers of the termination prior to installation in a connector or backplane, and/or to protect the fibers after installation particular in case the installation does not include other protection provisions, or to avoid the need for potting the termination, the preferred embodiment of the invention provides for coating the entire termination with a conformal coating 9 to provide a proven moisture barrier and thereby prevent the degradation of optical performance commonly caused by moisture absorption. For purposes of illustration, the conformal coating is schematically illustrated as being applied to the completed termination of the cable to the MT ferrule from a functional block labelled conformal coating, although the actual process is likely to involve vacuum deposition of a precursor material followed by polymerization. Following polymerization, all exterior surfaces of the termination are covered by the conformal coating 9 to form a sealed termination 10. It will be noted that openings 11 in the front surface 5 of the illustrated MT ferrule are pin alignment holes and do not represent the ends of the optical fiber.

A preferred conformal coating is MIL-I-46058, type XY conformal coating, also known as Parylene. Parylene is available from a variety of sources and is commonly used for protecting printed circuit boards, sensors, and other electronic and electrical devices. The specific manner in which the Parylene is applied forms no part of the present invention, so long as it is applied to the completed termination, the optical fiber and ferrule having otherwise been terminated to each other in conventional fashion, the cable having been stripped and fixed in the MT ferrule. The sooner that it is applied to the completed termination, the less environmental degradation that can occur before installation in a fiber optic connector, backplane, or other coupling arrangement.

While conformal coatings other than Parylene may be used, Parylene is preferred because it provides an excellent level of moisture protection, does not interfere with the flexibility of the cable, and can easily be removed from the butt surface of the connector prior to coupling with another cable connector.

Figure 2:
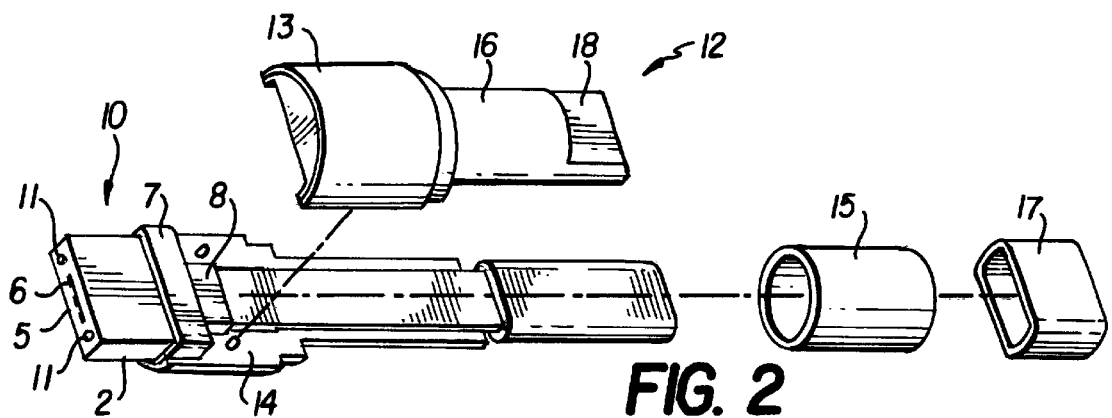
FIG. 2 shows the manner in which the MT termination of FIG. 1 is installed in a connector housing.
Figure 3:
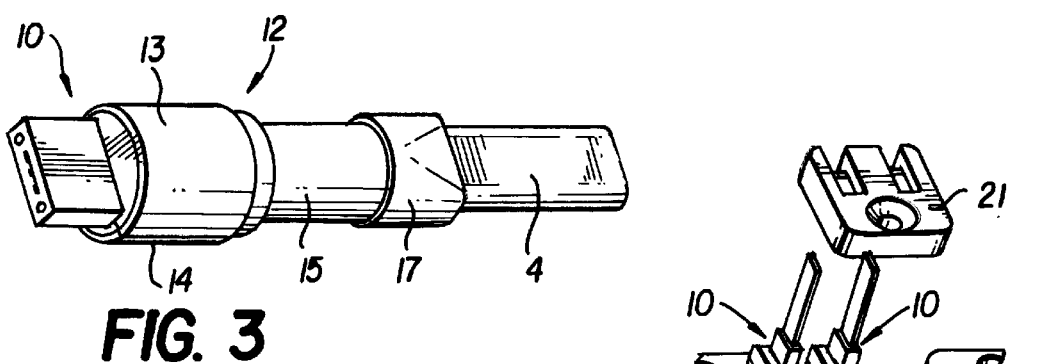
FIG. 3 shows the connector housing of FIG. 2, following assembly.

FIGS. 2 and 3 show an application in which a sealed termination 10 of the type shown in FIG. 1 is installed in a connector housing 1 2 of the type disclosed in U.S. patent application Ser. Nos. 09/149,568, filed Sep. 9, 1998 and U.S. Pat. No. 09/181,863, filed Oct. 29, 1998. In this case, the conformal coating protects the termination prior to installation in the connector, which involves positioning the connector between housing halves 13 and 14, and securing the housing halves together using a heat shrink sleeve 15 fitted over portion 16 of the housing and crimp ferrule 17 which crimps the outer jacket of the cable to a portion 18 at the end of the housing.

Following installation in the connector, as illustrated in FIG. 3, the front surface 5 of the MT ferrule is still exposed, as are the ends 6 of the optical fibers, but the front surface and fiber ends are protected by the conformal coating. When the connector housing 12 is to be joined with that of another connector, the coating simply needs to be peeled off the front surface 5 so that a good butt joint can be made with the corresponding ferrule of the mating connector.

Those skilled in the art will appreciate that the termination may be used in housing configurations other than the illustrated one, including the rectangular fiber optic couplers that are currently available from a variety of sources. Examples of other types of couplers that use MT ferrules include the mechanical transfer plug (MTP) and multiple access connector (MAC). In addition, the invention can easily be applied to fiber termination arrangements that involve ferrules other than the MT ferrule, or that otherwise require stripping of the fiber optic cable before termination.

Figure 4:
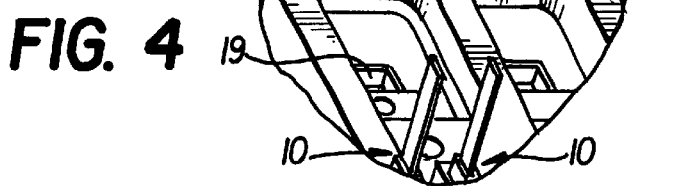
FIG. 4 shows an alternative installation of the termination of FIG. 1, in an optical backplane assembly.
Figure 5:
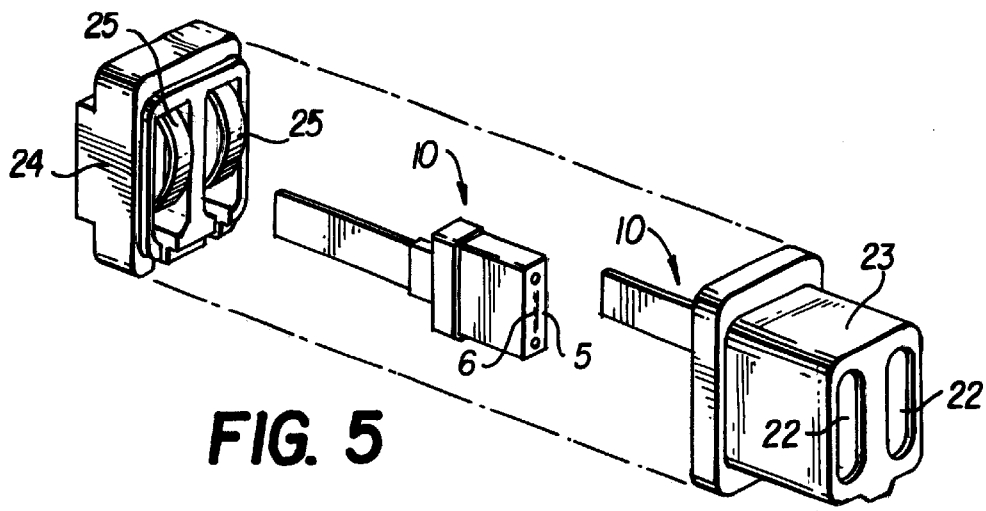
FIG. 5 shows installation of the termination of FIG. 1 in a connector arranged to mate with the optical backplane assembly of FIG. 4.

FIGS. 4 and 5 respectively show use of the coating MT connection in an optical backplane and corresponding line replaceable module (LRM) connector, of the type disclosed in U.S. patent application Ser. No. 09/006,193, cited above. In the example shown in FIG. 4, pairs of sealed MT-type terminations 10 of the same general type as shown in FIG. 1 are secured directly in openings 19 provided in an optical backplane 20 by a plate 21. In this example, use of the conformal coating according to the principles of the preferred embodiment of the invention eliminates the need for potting the openings.

In the example shown in FIG. 5, pairs of sealed MT-type terminations 10 corresponding to the termination illustrated in FIG. 1 are inserted into openings 22 in a rectangular connector structure, which in turn is captured by a backpiece 23, illustrated as including bias springs 24. In this case, even though the connectors can easily mechanically sealed, the conformal coating still protects the termination prior to assembly in the connector. In addition, the coating will protect the ends 6 of the fibers, if desired, until the coating is stripped off of polished front surface 5 of ferrule 2 just prior to insertion of the connector 23 into a backplane such as backplane 20 shown in FIG. 4.

Figure 6:
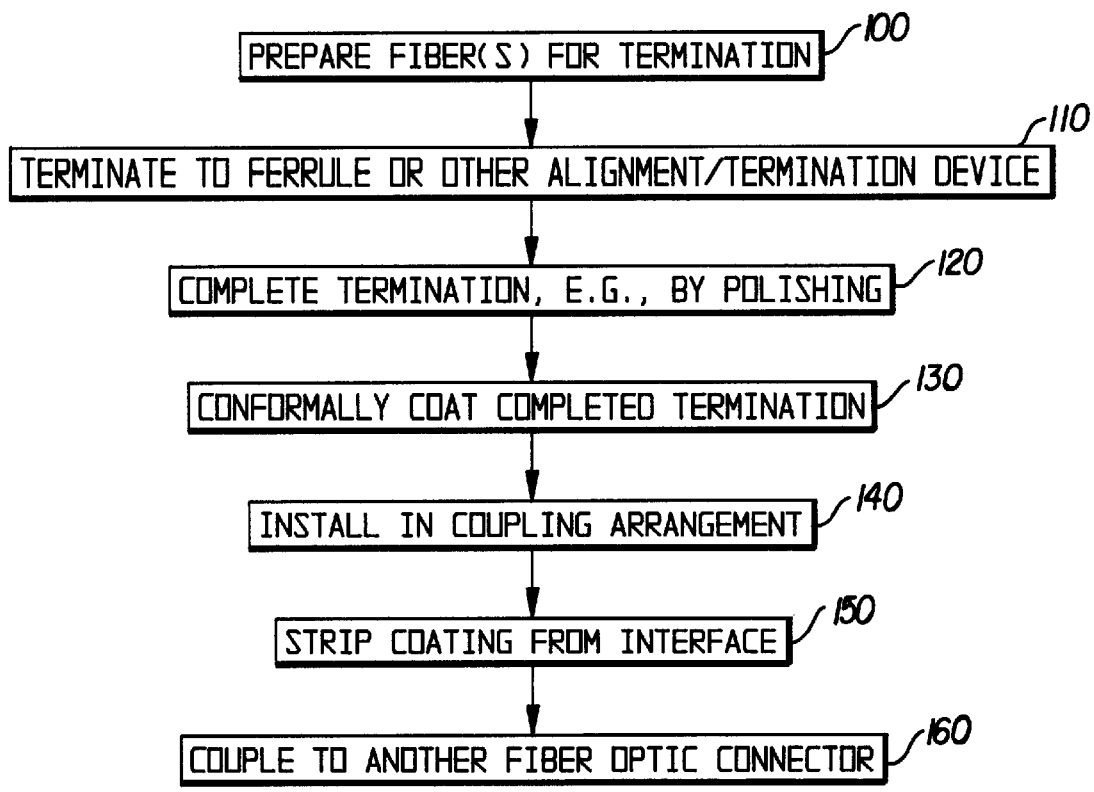
FIG. 6 is a flowchart illustrating the method of the preferred embodiment of the invention, which may be applied to the termination/connector arrangements shown in FIGS. 1–4, or in other connector termination arrangements.

The method of the preferred embodiment of the invention is further illustrated in FIG. 6. In the first step of the preferred method, a fiber optic cable is prepared for termination by stripping an outer jacket of the cable, the intermediate strength or insulation layers, and the fiber buffer according to the requirements of the connector or termination arrangement into which the fiber is to be installed or inserted (step 100). The prepared cable is then inserted or installed in an MT ferrule or other alignment and/or termination device which secures the ends of the cables and enables them to be mounted in a fiber optic connector, backplane, or other coupling arrangement (step 110). Once the cable is secured in the ferrule or other termination device, the front surface of the ferrule is polished and/or the termination is otherwise completed (step 120), after which a conformal coating such as 10 Parylene is applied to the entire assembly (step 130), at which time the coated assembly is protected until such time as it is ready to be installed in the fiber optic connector, backplane, or other coupling arrangement (step 140) in conventional fashion. In the case of a butt joint coupling, prior to coupling with a corresponding coupling arrangement, the conformal coating is stripped from the surface that includes the exposed ends of the fibers (step 150), after which the coupling may be completed in conventional fashion (step 160).

Having thus described a preferred embodiment of the invention with sufficient particularity to enable those skilled in the art to easily make and use the invention, and having described several possible variations and modifications of the preferred embodiment, it should nevertheless be appreciated that still further variations and modifications of the invention are possible, and that all such variations and modifications should be considered to be within the scope of the invention. Accordingly, the scope of the invention should not be limited by the above description, but rather should be interpreted solely in accordance with the appended claims.

I claim:

1. A method of protecting optical fibers following termination, comprising the steps of:
    preparing a fiber for termination by stripping protective layers of a fiber optic cable to expose at least a portion of the fiber, inserting the fiber into a termination device, completing termination of the fiber to the termination device, and conformally coating the completed termination to environmentally seal portions of the fiber that have been exposed during the step of stripping protective layers from the fiber optic cable.

2. A method as claimed in claim 1, wherein the step of inserting the fiber into a termination device comprises the step of inserting the fibers into an alignment ferrule.

3. A method as claimed in claim 2, wherein the step of completing the termination comprises the step of polishing a mating surface of the ferrule until ends of the fiber are coplanar with the mating surface.

4. A method as claimed in claim 1, further comprising the steps of, after conformally coating the completed termination, installing the completed termination in a coupling device and, prior to mating the coupling device with another coupling device, stripping the conformal coating from the mating surface of the ferrule.

5. A method as claimed in claim 1, wherein the step of applying the conformal coating comprises the step of applying Parylene.

6. A method as claimed in claim 1, wherein the step of preparing the fiber for termination comprises the step of stripping a cable jacket from the cable.

7. A method as claimed in claim 1, further comprising the step of, after conformally coating the completed termination, installing the completed termination into a fiber optic backplane.

8. An environmentally sealed fiber optic termination, comprising:
    at least one optical fiber from which protective layers have been removed in preparation for termination, and which have been inserted into a termination device to form a completed termination, and
    a conformal coating on the completed termination.

9. A termination as claimed in claim 8, wherein said at least one optical fiber is part of a multiple fiber cable, and said termination device is an alignment ferrule.

10. A termination as claimed in claim 9, wherein said alignment ferrule is a Mechanical Transfer (MT) ferrule.

11. A termination as claimed in claim 9, wherein said ferrule includes a polished mating surface from which the conformal coating has been stripped.

12. A termination as claimed in claim 8, wherein said conformal coating is a Parylene coating.

13. A fiber optic coupling arrangement, including a housing in which is installed at least one completed termination, said completed termination comprising:
    at least one optical fiber from which protective layers have been removed in preparation for termination, and which have been inserted into a termination device to form a completed termination, and
    a conformal coating on the completed termination.

14. A fiber optic coupling arrangement as claimed in claim 13, wherein said at least one optical fiber is part of a multiple fiber cable, and said termination device is an alignment ferrule.

15. A fiber optic coupling arrangement as claimed in claim 14, wherein said alignment ferrule is a Mechanical Transfer (MT) ferrule.

16. A fiber optic coupling arrangement as claimed in claim 14, wherein said ferrule includes a polished mating surface from which the conformal coating has been stripped.

17. A fiber optic coupling arrangement as claimed in claim 13, wherein said conformal coating is a Parylene coating.

* * * * *

UNITED STATES PATENT AND TRADEMARK OFFICE
CERTIFICATE OF CORRECTION

PATENT NO.   : 6,261,006 B1
DATED        : July 17, 2001
INVENTOR(S)  : Ritch Allen Selfridge It is certified that error appears in the above-identified patent and that said Letters Patent is hereby corrected as shown below:

Column 1,
Line 62, change "field" to -- filed --.

Column 3,
Line 43, before "the" insert -- of --.

Column 4,
Line 29, change "1 2" to -- 12 --.

Column 5,
Line 6, after "can" insert -- be --.

Signed and Sealed this

First Day of June, 2004

JON W. DUDAS
*Acting Director of the United States Patent and Trademark Office*